US009783667B2

(12) United States Patent
Weaver et al.

(10) Patent No.: US 9,783,667 B2
(45) Date of Patent: Oct. 10, 2017

(54) POLYMERIC BLEND COMPOSITION

(71) Applicant: Dow Global Technologies LLC, Midland, MI (US)

(72) Inventors: Laura B. Weaver, Johnson City, TN (US); Wei Wang, Yangpu (CN); Guang Ming Li, Sugar Land, TX (US); Lena T. Nguyen, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/903,486

(22) PCT Filed: Sep. 16, 2014

(86) PCT No.: PCT/US2014/055873
§ 371 (c)(1),
(2) Date: Jan. 7, 2016

(87) PCT Pub. No.: WO2015/047796
PCT Pub. Date: Apr. 2, 2015

(65) Prior Publication Data
US 2016/0194487 A1  Jul. 7, 2016

(30) Foreign Application Priority Data
Sep. 26, 2013  (WO) ................ PCT/CN2013/084292

(51) Int. Cl.
C08L 23/14 (2006.01)
C08L 23/16 (2006.01)
C08J 5/18 (2006.01)
C08L 23/08 (2006.01)

(52) U.S. Cl.
CPC ............... *C08L 23/142* (2013.01); *C08J 5/18* (2013.01); *C08L 23/0815* (2013.01); *C08L 23/0853* (2013.01); *C08L 23/14* (2013.01); *C08L 23/16* (2013.01); *C08J 2323/08* (2013.01); *C08J 2323/14* (2013.01); *C08J 2423/08* (2013.01); *C08J 2423/14* (2013.01)

(58) Field of Classification Search
CPC ............... C08L 23/142; C08L 23/0815; C08L 23/0853; C08L 23/14; C08L 23/16; C08J 5/18; C08J 2323/08; C08J 2323/14; C08J 2423/08; C08J 2423/14
See application file for complete search history.

(56) References Cited

U.S. PATENT DOCUMENTS

| 4,102,855 A * | 7/1978 | Kuan et al. ............. C08L 23/16 524/522 |
| 5,504,172 A | 4/1996 | Imuta et al. |
| 6,258,862 B1 | 7/2001 | Matz et al. |
| 6,525,157 B2 | 2/2003 | Cozewith et al. |
| 6,960,635 B2 | 11/2005 | Stevens et al. |
| 8,420,760 B2 | 4/2013 | Hughes et al. |
| 2002/0198322 A1 | 12/2002 | Jeong |
| 2006/0210804 A1 | 9/2006 | Yamada et al. |
| 2011/0041460 A1 * | 2/2011 | Weisinger et al. ...... B32B 27/32 53/441 |
| 2011/0178195 A1 | 7/2011 | Cheng |
| 2014/0364572 A1 | 12/2014 | Weaver et al. |
| 2016/0194487 A1 | 7/2016 | Weaver et al. |

FOREIGN PATENT DOCUMENTS

| CN | 102139552 A | 8/2011 |
| CN | 102482523 A | 5/2012 |
| CN | 103172918 A | 6/2013 |
| WO | 00/01745 | 1/2000 |
| WO | 2015/042820 A1 | 4/2015 |

OTHER PUBLICATIONS

PCT/CN2013/084292, International Search Report & Written Opinion, mailed Jul. 1, 2014.
PCT/US2014/055873, International Search Report & Written Opinion, mailed Jan. 26, 2015.
PCT/US2014/055873, International Preliminary Report on Patentability. Issue date Mar. 29, 2016.

* cited by examiner

*Primary Examiner* — Nathan M Nutter

(57) ABSTRACT

The instant invention provides a polymeric blend composition, injection molded articles, films and sheets made therefrom. The polymeric blend composition according to the present invention comprises: (a) a first component selected from the group consisting of an ethylene/alpha-olefin copolymer and a propylene/ethylene copolymer; wherein said ethylene/alpha-olefin co-polymer has density in the range of from 0.857 to 0.902 g/cm$^3$, a melt index ($I_2$) in the range of from 0.5 to 30 g/10 minutes, a DCS melting point temperature (second heat) in the range of from 40 to 99° C., a heat of fusion in the range of from 18 to 108 Jg$^{-1}$, and a crystallinity in the range of from 6 to 37 weight percent; and wherein propylene/ethylene copolymer has a melt flow rate in the range of from 1 to 30 g/10 minutes, a DCS melting point temperature (second heat) in the range of from 55 to 85° C., a heat of fusion in the range of from 10 to 40 Jg$^{-1}$, and a crystallinity in the range of from 6 to 21 weight percent; and (b) less than 40 percent by weight of a second component comprising an ethylene vinyl acetate copolymer comprising from 9 to 40 percent by weight of units derived from vinyl acetate, and wherein said ethylene vinyl acetate copolymer has a melt index ($I_2$) in the range of from 0.2 to 20 g/10 minutes; wherein $\Delta_n$ is less than 0.003, and wherein $\Delta_n$ is the absolute value of the difference between the refractive index of (a) and (b); and wherein dielectric loss factor of the polymeric blend composition is, equal to, or greater than, 0.024, for example in the range of greater than 0.024 to 0.15.

13 Claims, No Drawings

US 9,783,667 B2

POLYMERIC BLEND COMPOSITION

REFERENCE TO RELATED APPLICATIONS

The present application claims priority to International Application No. PCT/CN13/084292, filed on Sep. 26, 2013.

FIELD OF INVENTION

The instant invention relates to a polymeric blend composition, injection molded articles, films and sheets made therefrom.

BACKGROUND OF THE INVENTION

The use of polyethylene and/or polypropylene based materials in injection molded applications as well as film and/or sheet applications are generally known. However, currently commercially available polyethylene and/or polypropylene based materials fail to meet the required clarity while having acceptable radio frequency weldability.

Therefore, there is a need for a polymeric blend composition having improved clarity properties while possessing acceptable radio frequency weldability.

SUMMARY OF THE INVENTION

The instant invention provides a polymeric blend composition, injection molded articles, films and sheets made therefrom.

In one embodiment, the instant invention provides a polymeric blend composition comprising: (a) a first component selected from the group consisting of an ethylene/alpha-olefin copolymer and a propylene/ethylene copolymer; wherein said ethylene/alpha-olefin copolymer has density in the range of from 0.857 to 0.902 g/cm$^3$, a melt index ($I_2$) in the range of from 0.5 to 30 g/10 minutes, a DCS melting point temperature (second heat) in the range of from 40 to 99° C., a heat of fusion in the range of from 18 to 108 Jg$^{-1}$, and a crystallinity in the range of from 6 to 37 weight percent; and wherein propylene/ethylene copolymer has a melt flow rate in the range of from 1 to 30 g/10 minutes, a DCS melting point temperature (second heat) in the range of from 55 to 85° C., a heat of fusion in the range of from 10 to 40 Jg$^{-1}$, and a crystallinity in the range of from 6 to 21 weight percent; and (b) less than 40 percent by weight of a second component comprising an ethylene vinyl acetate copolymer comprising from 9 to 40 percent by weight of units derived from vinyl acetate, and wherein said ethylene vinyl acetate copolymer has a melt index ($I_2$) in the range of from 0.2 to 20 g/10 minutes; wherein $\Delta_n$ is less than 0.003, and wherein $\Delta_n$ is the absolute value of the difference between the refractive index of (a) and (b); and wherein dielectric loss factor of the polymeric blend composition is, equal to, or greater than, 0.024, for example in the range of greater than 0.024 to 0.15.

In an alternative embodiment, the instant invention further provides an injection molded article comprising the inventive polymeric blend composition.

In another alternative embodiment, the instant invention further provides a film comprising the inventive polymeric blend composition.

In another alternative embodiment, the instant invention further provides a sheet comprising the inventive polymeric blend composition.

In another alternative embodiment, the instant invention further provides a multilayer structure comprising the inventive film or sheet.

In another alternative embodiment, the instant invention further provides a polymeric blend composition according to the previous embodiments except that the polymeric blend composition has a haze of less than 36 percent.

In another alternative embodiment, the instant invention further provides an article comprising; a substrate, and a film associated with at least a surface of the substrate, wherein the film comprises the inventive polymeric blend composition, and wherein said film is coated or laminated to the at least one surface.

DETAILED DESCRIPTION OF THE INVENTION

The instant invention provides a polymeric blend composition, injection molded articles, films and sheets made therefrom. The polymeric blend composition according to the present invention comprises: (a) a first component selected from the group consisting of an ethylene/alpha-olefin copolymer and a propylene/ethylene copolymer; wherein said ethylene/alpha-olefin copolymer has density in the range of from 0.857 to 0.902 g/cm$^3$, a melt index ($I_2$) in the range of from 0.5 to 30 g/10 minutes, a DCS melting point temperature (second heat) in the range of from 40 to 99° C., a heat of fusion in the range of from 18 to 108 Jg$^{-1}$, and a crystallinity in the range of from 6 to 37 weight percent; and wherein propylene/ethylene copolymer has a melt flow rate in the range of from 1 to 30 g/10 minutes, a DCS melting point temperature (second heat) in the range of from 55 to 85° C., a heat of fusion in the range of from 10 to 40 Jg$^{-1}$, and a crystallinity in the range of from 6 to 21 weight percent; and (b) less than 40 percent by weight of a second component comprising an ethylene vinyl acetate copolymer comprising from 9 to 40 percent by weight of units derived from vinyl acetate, and wherein said ethylene vinyl acetate copolymer has a melt index ($I_2$) in the range of from 0.2 to 20 g/10 minutes; wherein $\Delta_n$ is less than 0.003, and wherein $\Delta_n$ is the absolute value of the difference between the refractive index of (a) and (b); and wherein dielectric loss factor of the polymeric blend composition is equal to, or greater than, 0.024, for example in the range of greater than 0.024 to 0.15.

First Component

The polymeric blend composition according to the present invention comprises equal to, or greater than, 40 percent by weight of the first component, for example, equal to, or greater than, 50 weight percent, or in the alternative, equal to, or greater than, 60 weight percent.

The first component can be selected from the group consisting of an ethylene/alpha-olefin copolymer, a propylene/ethylene copolymer, and combinations thereof.

Ethylene/Alpha-Olefin Copolymer

In one embodiment, the first component is an ethylene/alpha-olefin copolymer. The ethylene/alpha-olefin copolymer can be homogenously branched, substantially linear ethylene/alpha-olefin copolymer, commercially available under the trade names AFFINITY and/or ENGAGE from The Dow Chemical Company.

The ethylene/alpha-olefin copolymer comprises (a) less than or equal to 100 percent, for example, at least 70 percent, or at least 80 percent, or at least 90 percent, by weight of the units derived from ethylene; and (b) less than 30 percent, for example, less than 25 percent, or less than 20 percent, or less than 10 percent, by weight of units derived from one or more α-olefin comonomers. The term "ethylene/alpha-olefin copolymer" refers to a polymer that contains more than 50 mole percent polymerized ethylene monomer (based on the total amount of polymerizable monomers) and, optionally, may contain at least one comonomer.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The ethylene/alpha-olefin copolymer has a density in the range of 0.857 to 0.902 g/cm$^3$. For example, the density can be from a lower limit of 0.857, 0.862, 0.868, or 0.875, or 0.880 g/cm$^3$ to an upper limit of 0.885, 0.889, 0.895, or 0.902 g/cm$^3$.

The ethylene/alpha-olefin copolymer has a molecular weight distribution ($M_w/M_n$) in the range of from 1.0 to 3.5. For example, the molecular weight distribution ($M_w/M_n$) can be from a lower limit of 1.0, 1.1, or 1.2 to an upper limit of 2.5, 3.0 or 3.5.

The ethylene/alpha-olefin copolymer has a melt index ($I_2$) in the range of 0.5 to 30 g/10 minutes. For example, the melt index ($I_2$) can be from a lower limit of 0.5, 1, 2, or 5 g/10 minutes to an upper limit of 5, 10, 15, or 30 g/10 minutes.

The ethylene/alpha-olefin copolymer has a DSC melting point temperature (second heat) in the range of from 40 to 99° C. For example, the DSC melting point temperature (second heat) can be from a lower limit of 40, 47, 54, 64 or 70° C. to an upper limit of 78, 82, 90, or 99° C.

The ethylene/alpha-olefin copolymer has a heat of fusion in the range of from 18 to 108 Jg$^{-1}$. For example, the heat of fusion can be from a lower limit of 9, 21, 34, 50, or 61 Jg$^{-1}$ to an upper limit of 72, 80, 93 or 108 Jg$^{-1}$.

The ethylene/alpha-olefin copolymer has a crystallinity in the range of from 6 to 37 weight percent. For example, the crystallinity can be from a lower limit of 3, 7, 12, 17, or 21 weight percent to an upper limit of 25, 28, 32, or 37 weight percent.

The ethylene/alpha-olefin copolymer has a molecular weight ($M_w$) in the range of 50,000 to 250,000 daltons. For example, the molecular weight ($M_w$) can be from a lower limit of 50,000, 60,000, 70,000 daltons to an upper limit of 150,000, 180,000, 200,000 or 250,000 daltons.

The ethylene/alpha-olefin copolymer may further comprise additional components, such as one or more other polymers and/or one or more additives. Such additives include, but are not limited to, antistatic agents, color enhancers, dyes, lubricants, fillers such as TiO$_2$ or CaCO$_3$, opacifiers, nucleators, processing aids, pigments, primary antioxidants, secondary antioxidants, processing aids, UV stabilizers, anti-blocks, slip agents, tackifiers, fire retardants, anti-microbial agents, odor reducer agents, anti fungal agents, and combinations thereof. The ethylene/alpha-olefin copolymer may contain from about 0.1 to about 10 percent by the combined weight of such additives, based on the combined weight of the ethylene/alpha-olefin copolymer and such additives.

Any conventional ethylene (co)polymerization reaction processes may be employed to produce the ethylene/alpha-olefin copolymer. Such conventional ethylene (co)polymerization reaction processes include, but are not limited to, gas phase polymerization process, slurry phase polymerization process, solution phase polymerization process, and combinations thereof, using one or more conventional reactors, e.g., fluidized bed gas phase reactors, loop reactors, stirred tank reactors, batch reactors in parallel, series, and/or any combinations thereof.

Such ethylene/alpha-olefin copolymers are commercially available under the trade names AFFINITY and/or ENGAGE from The Dow Chemical Company.

Propylene/Ethylene Copolymer

In one embodiment, the first component can be a propylene/ethylene copolymer.

In certain other embodiments, the propylene/ethylene copolymer is, for example, a semi-crystalline polymer having a DSC melting point temperature (second heat) in the range of from 55 to 85° C. For example, the DSC melting point temperature (second heat) can be from a lower limit of 55, 60 or 65° C. to an upper limit of 70, 75, 80 or 85° C.

In one particular embodiment, the propylene/ethylene copolymer is characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; and in another alternative, greater than about 0.93. Isotactic triads are well-known in the art, and are described in, for example, U.S. Pat. No. 5,504,172 and International Publication No. WO 00/01745, which refer to the isotactic sequence in terms of a triad unit in the copolymer molecular chain, determined by $^{13}$C NMR spectra.

The propylene/ethylene copolymer may have a melt flow rate in the range of from 1 to 30 g/10 minutes, measured in accordance with ASTM D-1238 (at 230° C./2.16 Kg). All individual values and subranges from 1 to 30 g/10 minutes are included herein and disclosed herein; for example, the melt flow rate can be from a lower limit of 1 g/10 minutes, 2 g/10 minutes, 4 g/10 minutes, 5 g/10 minutes, 10 g/10 minutes, or 15 g/10 minutes to an upper limit of 30 g/10 minutes, 25 g/10 minutes, 20 g/10 minutes, 18 g/10 minutes, 15 g/10 minutes, 10 g/10 minutes, 8 g/10 minutes, or 5 g/10 minutes.

The propylene/ethylene copolymer has a heat of fusion in the range of from 10 to 40 Jg$^{-1}$. For example, the heat of fusion can be from a lower limit of 10, 12, 15, or 20 Jg$^{-1}$ to an upper limit of 20, 25, 35, or 40 Jg$^{-1}$.

The propylene/ethylene copolymer has a crystallinity in the range of from 6 to 21 weight percent. For example, the crystallinity can be from a lower limit of 6, 8, 10, or 15 weight percent to an upper limit of 10, 12, 17 or 21 weight percent.

The crystallinity is measured via Differential scanning calorimetry (DSC) method. The propylene/ethylene copolymer comprises units derived from propylene monomers and units derived from ethylene comonomers.

The propylene/ethylene copolymer comprises from 1 to 40 percent by weight of units derived from ethylene comonomers. All individual values and subranges from 1 to 40 weight percent are included herein and disclosed herein; for example, the weight percent of units derived from ethylene comonomers can be from a lower limit of 1, 3, 4, 5, 7, or 9 weight percent to an upper limit of 40, 35, 30, 27, 20, 15, 12, or 9 weight percent. For example, the propylene/ethylene copolymer comprises from 1 to 35 percent by weight of units derived from ethylene comonomers; or in the alternative, the propylene/ethylene copolymer comprises from 1 to 30 percent by weight of units derived from ethylene comonomers; or in the alternative, the propylene/ethylene copolymer comprises from 3 to 27 percent by weight of units derived from ethylene comonomers; or in the alternative, the propylene/ethylene copolymer comprises from 3 to 20 percent by weight of units derived from ethylene comonomers; or in the alternative, the propylene/ethylene comprises from 3 to 15 percent by weight of units derived from ethylene comonomers.

The propylene/ethylene copolymer has a molecular weight distribution (MWD), defined as weight average molecular weight divided by number average molecular weight ($M_w/M_n$) of 3.5 or less; in the alternative 3.0 or less; or in another alternative from 1.8 to 3.0.

In one embodiment, the propylene/ethylene copolymer has a molecular weight distribution (MWD) greater than, or equal to, 1.6, further greater than, or equal to, 1.8, further greater than, or equal to, 2.0.

In one embodiment, the propylene/ethylene copolymer has a molecular weight distribution (MWD) less than, or equal to, 3.5, further less than, or equal to, 3.2, further less than, or equal to, 3.0, further less than, or equal to, 2.8.

Such propylene/ethylene copolymers are further described in details in the U.S. Pat. Nos. 6,960,635 and 6,525,157, and 8,420,760, each of which is incorporated herein by reference. Such propylene/ethylene copolymers are commercially available from The Dow Chemical Company, under the tradename VERSIFY™, or from ExxonMobil Chemical Company, under the tradename VISTAMAXX™.

Second Component

The polymeric blend composition according to the present invention comprises less than 50 percent by weight of the second component, for example, less than 40 weight percent, or in the alternative, less than 30 weight percent. The second component comprises an ethylene vinyl acetate copolymer comprising from 9 to 50 percent by weight of units derived from vinyl acetate; for example from 9 to 40 percent by weight of units derived from vinyl acetate; or in the alternative, from 12 to 35 percent by weight of units derived from vinyl acetate; or in the alternative, from 17 to 29 percent by weight of units derived from vinyl acetate.

Production

The polymeric blend composition can be prepared via any conventional melt blending process, such as extrusion via an extruder, e.g., single or twin screw extruder. The first component, second component, and optionally one or more additives and/or fillers can be melt blended in any order via one or more extruders to form a uniform polymeric blend composition.

In application, the polymeric blend composition can be formed into one or more injection molded articles, one or more films, one or more sheets, one or more tapes, and/or one or more multilayer structures comprising such one or more films, one or more sheets, and/or more tapes via any conventional methods. Such methods include, but are not limited to, injection molding process, blown film extrusion process, and/or cast film extrusion process, and/or sheet calendering process.

In the injection molding process, the polymeric blend composition is fed into an extruder via a hopper. The extruder conveys, heats, melts, and pressurizes the polymeric blend composition to a form a molten stream. The molten stream is forced out of the extruder under pressure through a nozzle, into a relatively cool mold, held closed thereby filling the mold. The melt cools and hardens until fully set-up. The mold then opens and the molded article is removed.

In blown film extrusion process, the molten polymeric blend composition is extruded through an annular slit die, usually vertically, to form a thin walled tube. Air is introduced via a hole in the centre of the die to blow up the tube like a balloon. Mounted on top of the die, a high-speed air ring blows onto the hot film to cool it. The tube of film then continues upwards, continually cooling, until it passes through nip rolls, where the tube is flattened to form a lay-flat tube of film. This lay-flat or collapsed tube is then taken back down the extrusion tower, via more rollers. In one embodiment, the polymeric blend composition is formed into a single layer film, via a blown film process. In another embodiment, the polymeric blend composition may be formed into a multi-layer blown film structure. In another embodiment, the polymeric blend composition may be formed into a single layer or a multi-layer blown film structure associated with one or more substrates. The blown films prepared according to the present invention may be used as lamination films, where the blown film is adhesively laminated to a substrate. The blown films according to the present invention can have a thickness in the range of from 0.5 to 10 mils.

In the cast film extrusion process, a thin film is extruded through a slit onto a chilled, highly polished turning roll, where it is quenched from one side. The speed of the roller controls the draw ratio and final film thickness. The film is then sent to a second roller for cooling on the other side. Finally it passes through a system of rollers and is wound onto a roll. The cast films according to the present invention have a thickness in the range of from 0.5 to 20 mils.

The sheets according to the present invention can be prepared via calendering process and can have a thickness in the range of from 10 to 30 mils.

Injected molded articles of the present invention can be used as a valve, container, plaque, cap, toy, and the like. Such injected molded articles can be welded to other polymeric materials, such as polyolefin via radio frequency welding (RF welding).

Such films, sheets, tapes, and molded articles have improved clarity and RF weldability while maintain other properties.

DEFINITIONS

Unless stated to the contrary, all test methods are current as of the filing date of this disclosure.

The term "composition," as used herein, includes materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. A polymer may also contain trace amounts of catalyst residues and/or other residues associated with its polymerization and/or isolation.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomers.

The term, "propylene-based polymer," as used herein, refers to a polymer that comprises, in polymerized form, a majority amount of propylene monomer (based on the weight of the polymer), and optionally may comprise one or more comonomers.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene/α-olefin interpolymer," as used herein, refers to an interpolymer that comprises, in polymerized form, a majority amount of ethylene monomer (based on the weight of the interpolymer), and at least one α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term, "propylene/ethylene copolymer," as used herein, refers to a copolymer that comprises, in polymerized form, a majority amount of propylene monomer (based on the weight of the copolymer), and ethylene, as the only two monomer types.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

EXAMPLES

The following examples illustrate the present invention but are not intended to limit the scope of the invention. The examples of the instant invention demonstrate that RF weldability is achieved, while maintaining optical properties in accordance with the present invention. The following examples further illustrate that a low haze and transparent compound can be achieved, when the difference of the refractive index of the two phases is minimized.

Formulation Components

Formulation components, i.e. first component and second component, are described in Tables 1 and 2. The properties of the first component, i.e. an ethylene/alpha-olefin copolymer and/or a propylene/ethylene copolymer, are reported in Table 1, and the properties of the second component i.e. ethylene vinyl acetate, are reported in Table 2.

TABLE 1

| 1st Component | Density (g/cm³) | Melting Point (° C.) | MI (@ 190° C.) (when Ethylene is main polymer) or MFR*(@ 230° C.) (g/10 min) (when propylene is main polymer) | Main monomer | Co-monomer | Refractive Index (*) |
|---|---|---|---|---|---|---|
| VERSIFY 3300 | 0.866 | 62 | 8* | Propylene | Ethylene | 1.481 |
| VERSIFY 2300 | 0.866 | 66 | 2* | Propylene | Ethylene | 1.481 |
| VERSIFY 3200 | 0.876 | 85 | 8* | Propylene | Ethylene | 1.486 |
| VERSIFY 2200 | 0.876 | 82 | 2* | Propylene | Ethylene | 1.486 |
| VERSIFY 3000 | 0.890 | 108 | 8* | Propylene | Ethylene | 1.494 |
| VERSIFY 2000 | 0.888 | 107 | 2* | Propylene | Ethylene | 1.493 |
| DOWLEX ™ SC 2107G | 0.917 | 124 | 2.3 | Ethylene | 1-Octene | 1.515 |
| DOW ™ LDPE PG 7008 | 0.918 | 106 | 7.5 | Ethylene | | 1.516 |
| ENGAGE 8411 | 0.88 | 76 | 18 | Ethylene | 1-Octene | 1.494 |
| ENGAGE 8452 | 0.875 | 66 | 3 | Ethylene | 1-Octene | 1.491 |
| AFFINITY KC 8852G | 0.875 | 51 | 3 | Ethylene | 1-Octene | 1.491 |
| AFFINITY PL 1850G | 0.902 | 97 | 3 | Ethylene | 1-Octene | 1.507 |
| AFFINITY PL 1845G | 0.91 | 104 | 3.5 | Ethylene | 1-Octene | 1.511 |
| Exceed 1018 LA | 0.918 | 118 | 1 | Ethylene | | 1.516 |

TABLE 2

| 2nd Component | VA Content (wt %) | MI (@ 190° C.) | Refractive Index (*) |
|---|---|---|---|
| ELVAX ™ 460 | 18 | 2.5 | 1.497 |
| Hanwha EVA 1157 | 18 | 16 | 1.497 |
| Taisox ™ EVA 7360M | 21 | 2 | 1.494 |
| ELVAX ™ 360 | 25 | 2 | 1.490 |
| ELVAX ™ 265 | 28 | 3 | 1.487 |
| ELVAX ™ 250 | 28 | 25 | 1.487 |

Inventive Compositions 1-7 and Comparative Compositions 1-31

Inventive Compositions 1-7 and Comparative Compositions 1-31 were compounded on a Coperion ZSK-26 MC 60 L/D twin screw extruder based on the formulation components reported in Tables 4-7. The compounding twin screw extruding process conditions are reported in Table 3. The ZSK-26 MC extruder was operated at 300 RPMS and temperatures at 140° C. The total throughput is 50 LB/HR. The strand was water-bath cooled and strand-cutter pelletized in pellet form. Properties of Inventive Compositions 1-7 and Comparative Compositions 1-31 were measured and reported in Tables 4-7.

TABLE 3

| Barrel | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Temperature (° C.) | 25 | 25 | 25 | 140 | 140 | 140 | 140 | 140 | 140 | 140 | 140 | 140 | 140 | 140 | 140 | 140 |

TABLE 4

| | Versify 2000 | Versify 3000 | Versify 2200 | Versify 3200 | Versify 2300 | Versify 3300 | Elvax-460 | Elvax 265 | Loss Factor @ 27.12 MHz | Weldability | Haze | Delta n |
|---|---|---|---|---|---|---|---|---|---|---|---|---|
| Inventive Composition 1 | 0% | 0% | 40% | 40% | 0% | 0% | 0% | 20% | 0.024 | Yes | 33.3 | 0.001 |
| Inventive Composition 2 | 0% | 0% | 35% | 35% | 0% | 0% | 0% | 30% | 0.037 | Yes | — | 0.001 |
| Inventive Composition 3 | 0% | 0% | 30% | 30% | 0% | 0% | 0% | 40% | 0.048 | Yes | 30.5 | 0.001 |
| Inventive Composition 4 | 0% | 0% | 20% | 20% | 0% | 0% | 0% | 60% | 0.073 | Yes | 29.7 | 0.001 |

TABLE 5

| | Versify 2000 | Versify 3000 | Versify 2200 | Versify 3200 | Versify 2300 | Versify 3300 | Elvax-460 | Elvax 265 | Loss Factor @ 27.12 MHz | Weldability | Haze | Delta n |
|---|---|---|---|---|---|---|---|---|---|---|---|---|
| Comparative Composition 1 | 0% | 0% | 35% | 35% | 0% | 0% | 30% | 0% | 0.022 | Yes | 89.1 | 0.011 |
| Comparative Composition 2 | 0% | 0% | 30% | 30% | 0% | 0% | 40% | 0% | 0.028 | Yes | 93.4 | 0.011 |
| Comparative Composition 3 | 0% | 0% | 20% | 20% | 0% | 0% | 60% | 0% | 0.042 | Yes | 94.3 | 0.011 |
| Comparative Composition 4 | 0% | 0% | 45% | 45% | 0% | 0% | 10% | 0% | 0.008 | No | 48.1 | 0.011 |
| Comparative Composition 5 | 0% | 0% | 0% | 0% | 45% | 45% | 10% | 0% | 0.008 | No | — | 0.016 |
| Comparative Composition 6 | 0% | 0% | 40% | 40% | 0% | 0% | 20% | 0% | 0.014 | No | 72.1 | 0.011 |
| Comparative Composition 7 | 0% | 0% | 0% | 0% | 40% | 40% | 20% | 0% | 0.015 | No | — | 0.016 |
| Comparative Composition 8 | 30% | 30% | 0% | 0% | 0% | 0% | 40% | 0% | 0.030 | No | — | 0.003 |
| Comparative Composition 9 | 0% | 0% | 0% | 0% | 20% | 20% | 60% | 0% | 0.049 | No | — | 0.016 |
| Comparative Composition 10 | 30% | 30% | 0% | 0% | 0% | 0% | 0% | 40% | 0.045 | No | — | 0.007 |

TABLE 6

| | ENGAGE 8411 | ENGAGE 8452 | AFF KC 8852G | AFF PL 1850G | AFF PL 1845G | DOW LDPE PG 7008 | DOWLEX 2107G | Exceed 1018 | Elvax-460 | Hanwha EVA 1157 |
|---|---|---|---|---|---|---|---|---|---|---|
| Inventive Composition 5 | 70% | | | | | | | | | |
| Inventive Composition 6 | 70% | | | | | | | | | 30% |
| Inventive Composition 7 | | 70% | | | | | | | | |

| | Taisox EVA 7360M | Elvax 360 | Elvax 265 | Elvax 250 | Loss Factor @ 27.12 MHz | Weldability | Haze | Delta n |
|---|---|---|---|---|---|---|---|---|
| Inventive Composition 5 | 30% | | | | 0.030 | Yes | 16 | 0.000 |

TABLE 6-continued

| | | | | | |
|---|---|---|---|---|---|
| Inventive Composition 6 | | | 0.026 | Yes | 19 | 0.003 |
| Inventive Composition 7 | | 30% | 0.035 | Yes | 35.5 | 0.001 |

TABLE 7

| | ENGAGE 8411 | ENGAGE 8452 | AFF KC 8852G | AFF PL 1850G | AFF PL 1845G | DOW LDPE PG 7008 | DOWLEX 2107G | Exceed 1018 | Elvax-460 | Hanwha EVA 1157 |
|---|---|---|---|---|---|---|---|---|---|---|
| Comparative Composition 13 | — | — | 90% | | | | | | 10% | — |
| Comparative Composition 14 | — | — | 45% | 45% | | | | | 10% | — |
| Comparative Composition 15 | — | — | | 90% | | | | | 10% | — |
| Comparative Composition 16 | — | — | 40% | 40% | | | | | 20% | — |
| Comparative Composition 17 | — | — | | 80% | | | | | 20% | — |
| Comparative Composition 18 | — | — | | | 80% | | | | 20% | — |
| Comparative Composition 19 | — | — | | | | 80% | | | 20% | — |
| Comparative Composition 20 | — | — | | | | | 80% | | 20% | — |
| Comparative Composition 21 | — | — | | | | | | 80% | 20% | — |
| Comparative Composition 22 | — | — | 70% | | | | | | 30% | — |
| Comparative Composition 23 | — | — | | 70% | | | | | 30% | — |
| Comparative Composition 24 | — | — | 60% | | | | | | 40% | — |
| Comparative Composition 25 | — | — | | 60% | | | | | 40% | — |
| Comparative Composition 26 | — | — | | | | 60% | | | 40% | — |
| Comparative Composition 27 | — | — | | | | | 60% | | 40% | — |
| Comparative Composition 28 | — | — | | 40% | | | | | 60% | — |
| Comparative Composition 29 | — | — | | 60% | | | | | 40% | — |
| Comparative Composition 30 | — | — | | 40% | | | | | — | — |
| Comparative Composition 31 | 70% | — | — | — | — | — | — | — | — | — |

| | Taisox EVA 7360M | Elvax 360 | Elvax 265 | Elvax 250 | Loss Factor @ 27.12 MHz | Weldability | Haze | Delta n |
|---|---|---|---|---|---|---|---|---|
| Comparative Composition 13 | — | — | — | — | 0.007 | No | 48.9 | 0.006 |
| Comparative Composition 14 | — | — | — | — | 0.008 | No | — | — |

TABLE 7-continued

| | | | | | | | | |
|---|---|---|---|---|---|---|---|---|
| Comparative Composition 15 | — | — | | | 0.009 | No | 87.2 | 0.010 |
| Comparative Composition 16 | — | — | | | 0.015 | No | — | — |
| Comparative Composition 17 | — | — | | — | 0.017 | No | 92.7 | 0.010 |
| Comparative Composition 18 | — | — | | — | 0.016 | No | 98.1 | 0.014 |
| Comparative Composition 19 | — | — | | — | 0.016 | No | 100.0 | 0.019 |
| Comparative Composition 20 | — | — | | — | 0.015 | No | 100.0 | 0.018 |
| Comparative Composition 21 | — | — | | — | 0.015 | No | 100.0 | 0.019 |
| Comparative Composition 22 | — | — | | — | 0.018 | Yes | 83.8 | 0.006 |
| Comparative Composition 23 | — | — | | — | 0.024 | Yes | 97.2 | 0.010 |
| Comparative Composition 24 | — | — | | — | 0.028 | Yes | 96.3 | 0.006 |
| Comparative Composition 25 | — | — | | — | 0.030 | Yes | 97.2 | 0.010 |
| Comparative Composition 26 | — | — | | — | 0.031 | No | 100.4 | 0.019 |
| Comparative Composition 27 | — | — | | — | 0.032 | No | 97.2 | 0.010 |
| Comparative Composition 28 | — | — | | — | — | No | 100.0 | 0.010 |
| Comparative Composition 29 | — | — | | — | 0.077 | Yes | 96.0 | 0.010 |
| Comparative Composition 30 | — | — | 60% | — | 0.077 | Yes | 92.5 | 0.020 |
| Comparative Composition 31 | — | — | — | 30% | 0.039* | Yes | 55 | 0.007 |

Test Methods

Test methods include the following:

Density

Samples that are measured for density are prepared according to ASTM D4703. Measurements are made within one hour of sample pressing using ASTM D792, Method B.

Melt Index

Melt index ($I_2$) is measured in accordance with ASTM D1238, Condition 190° C./2.16 kg, and is reported in grams eluted per 10 minutes.

Melt flow rate is measured in accordance with ASTM D1238, Condition 230° C./2.16 kg, and is reported in grams eluted per 10 minutes.

Differential Scanning Calorimetry (DSC)

DSC can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (~25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C., and held isothermal for 3 minutes, in order to remove its thermal history. Next, the sample is cooled to −40° C. at a 10° C./minute cooling rate, and held isothermal at −40° C. for 3 minutes. The sample is then heated to 150° C., or, if needed, higher until melting is complete (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature ($T_m$), peak crystallization temperature ($T_c$), heat of fusion ($H_f$) (in Joules per gram), and the calculated % crystallinity for samples using appropriate equation, for example for the ethylene/alpha-olefin interpolymer or copolymer using the following Equation 1.

% Crystallinity=$((H_f)/(292 \text{ J/g}))\times 100$  Equation 1

The heat of fusion ($H_f$) and the peak melting temperature are reported from the second heat curve. Peak crystallization temperature is determined from the cooling curve. For the propylene/ethylene copolymers, % cryst.=$((H_f)/(165 \text{ J/g}))\times 100$.

Conventional Gel Permeation Chromatography (GPC)

The GPC system consists of either a Polymer Laboratories Model PL-210 or a Polymer Laboratories Model PL-220 instrument equipped with a refractive index (RI) concentration detector. The column and carousel compartments are operated at 140° C. Three Polymer Laboratories 10-μm Mixed-B columns are used with the solvent 1,2,4-trichlorobenzene. The samples are prepared at a concentration of 0.1 g of polymer in 50 milliliters of solvent. The solvent used to prepare the samples contains 200 ppm of the antioxidant butylated hydroxytoluene (BHT). Samples are prepared by agitating lightly for four hours at 160° C. The injection volume used is 200 microliters, and the flow rate is 1.0 ml/min. Calibration of the GPC column set is performed with twenty one narrow molecular weight distribution polystyrene standards purchased from Polymer Laboratories.

The polystyrene standard peak molecular weights ($M_{PS}$) are converted to polyethylene molecular weight ($M_{PE}$) using Equation 1A. The equation is described in Williams and Ward, J. Polym. Sci., Polym. Letters, 6, 621 (1968)):

$$M_{PE}=A\times(M_{PS})^B$$  Equation 1A

Where A has a value of 0.4316 and B is equal to 1.0.
The molecular weights for propylene-based polymers can be determined using Mark-Houwink ratios according to ASTM D6474, where, for polystyrene a=0.702 and log K=−3.900, and for polypropylene, a=0.725 and log K=−3.721. For propylene-based polymer samples, the column and carousel compartments are operated at 160° C. See also, for polypropylene: Th. G. Scholte, N. L. J. Meijerink, H. M. Schoffeleers, and A. M. G. Brands, *J. Appl. Polym. Sci.*, 29, 3763-3782 (1984); for polystyrene: E. P. Otocka, R. J. Roe, N. Y. Hellman, P. M. Muglia, *Macromolecules*, 4, 507 (1971); and $$M_{PP} = \left(\frac{K_{PS}M_{PS}^{a_{PS}+1}}{K_{PP}}\right)^{\frac{1}{a_{PP}+1}},$$  Equation 1B where $M_{PP}$ is PP equivalent MW, $M_{PS}$ is PS equivalent MW, log K and a values of Mark-Houwink coefficients for PP and PS are listed below in Table A.

TABLE A

| Polymer | a | log K |
|---|---|---|
| Polypropylene | 0.725 | −3.721 |
| Polystyrene | 0.702 | −3.900 |

A third order polynomial is determined to build the logarithmic molecular weight calibration as a function of elution volume.

Polyethylene equivalent molecular weight calculations were performed using PolymerChar "GPC One" software. The number average molecular weight (Mn), weight average molecular weight (Mw), and z-average molecular weight (Mz) was calculated by inputting the GPC results in equations 2 to 4:

$$\overline{Mn} = \frac{\sum^i RI_i}{\sum^i (RI_i / M_{PE,i})}$$  Equation 2

$$\overline{Mw} = \frac{\sum^i (RI_i * M_{PE,i})}{\sum^i (RI_i)}$$  Equation 3

$$\overline{Mz} = \frac{\sum^i (RI_i * M_{PE,i}^2)}{\sum^i (RI_i * M_{PE,i})}$$  Equation 4

Where $RI_i$ and $M_{PE,i}$ are the concentration detector baseline corrected response and conventional calibrated polyethylene molecular weight for the $i^{th}$ slice of the concentration response, elution volume paired data set. The precision of the weight-average molecular weight ΔMw is <2.6%.

The MWD is expressed as the weight average molecular weight (Mw) divided by the number average molecular weight (Mn).

The GPC column set is calibrated by running 21 narrow molecular weight distribution polystyrene standards. The molecular weight (MW) of the standards ranges from 580 to 8,400,000, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to or greater than 1,000,000 and 0.05 g in 50 mL of solvent for molecular weights less than 1,000,000. The polystyrene standards were dissolved at 80° C. with gentle agitation for 30 minutes. The narrow standards mixtures are run first and in order of decreasing highest molecular weight component to minimize degradation.

Injection Molding

All of the sample plaques and sample chips were molded using a Krauss Maffei KM 110-390/390 CL Injection Molding Machine, equipped with a single shot mold base.

The haze/clarity chip samples (60×60×2 mm plaques) were molded with Axxicon Mold Inserts.
  B-insert. 60×60×2 mm plaque
  A-insert. Aim Mirror insert. Polished NO/N1 (SPI-SPE 1-2) according ISO 1302

The Tensile samples (ASTM D 638 Type I Tensile bar) were molded with Axxicon Mold Inserts.
  B-insert. ASTM D 638 Type I Tensile. 165(6.5")×13 (0.5")×3.2(0.125") mm
  A-insert. Aim Mirror insert. Polished NO/N1 (SPI-SPE 1-2) according ISO 1302

Tape Extrusion:

The compounded blend in pellets form was extruded with a Haake single extruder (¾" diameter and 25 L/D) attached with a tape/slot die. The typical extrusion condition was applied (~50 RPM and Temperature profile from 140° C. to 190° C.). The extrudate was taken off on a chill rolls system with 3 rolls configurations. The temperature of the chill roll was controlled at about 15 °C. The finished tape films are collected on a wind-up system, and the dimension of the tapes are 3.5~4" wide and 10 or 15 mils thick.

RF Welding:

The extruded tape films are each Radio-Frequency welded with a Callanan RF Welder. The power output of the Callanan RF Welder is 2 KW, and the operation/generator frequency is 27.12 MHz. For each composition, "10 inch lengths" of tape were cut to provide a "3.5-4 inch×10 inch×10-15 mils" tape section. Two tape sections were placed, one on top of the other, to form a "3.5-4 inch×10 inch×20-30 mils" tape test sample. A seal bar/die of dimensions "½ inch×8 inch" was positioned in the mid-line region of the test sample, with the length of the bar parallel to the length of the test sample, to form a RF weld of dimensions: ½ inch×8 inch, along the length of the test sample, with a one inch unwelded region at each end of the test sample. The films were sealed in the machine direction. During the RF welding process, the films to be welded are placed between the seal bar and bottom metal plate. The seal bar is brought down to the bottom metal plate, via a pneumatic cylinder at 30 psi pressure, and the films are pressed between the bar, and the plate when an RF frequency is applied. The power level setting can be adjusted from 0% to 100%. The typical setting is 80%-90% in this invention. The typical weld time in this invention is 2 to 4 seconds.

In order to tune RF welder, the Clayton setting is adjusted to optimize the resonant frequency of the work piece. The maximum power can be coupled, out of the generator, when the resonant frequency of the work piece is nearly resonant at the output frequency of generator (27.12 MHz). In this invention, the Clayton setting is set from 20 to 22. After each test sample is welded, the sample is allowed to cool to room temperature overnight at ambient temperature and atmosphere. The test sample is then hand pulled, to determine if the two tape sections can be separated, without breaking the weld ("break at seal" failure). If such separation occurred, the test sample is not RF weldable. If no such separation occurred, the test sample is RF weldable.

Weld Strength/Peel Measurement:

Welded films (see above) are cut into 1" wide stripes in CD direction. These stripes are then pulled in CD direction using an Instron. The Peak Load during pulling is recorded as the weld strength.

Dielectric Spectroscopy (DES)

Dielectric spectroscopy measurements were performed over a frequency range of $1 \times 10^6$ Hz to $3 \times 10^9$ Hz using an Agilent 4991A RF Impedance/Material Analyzer, controlled by a personal computer (NOVOCONTROL Technologies GmbH & Co. KG). All measurements were performed at room temperature under dry nitrogen. Approximately 11 mm diameter circles were punched out of the sheets (extruded tapes) using a cork borer. Samples were measured with a micrometer for thickness, and scanned between two gold-coated electrodes 10 mm in diameter. As all samples had similar densities and thicknesses, individual masses were not recorded. Rather, it was assumed that the average mass of a given sample would be included in the coefficient of the $\Delta H_{absorbed}$ parameter. The dielectric loss factor (or Loss Factor at 27.12 MHz) was generated by the computer.

Haze:

The clarity and haze of sample chips of 2 mm thickness were measured using BYK Gardner Haze-gard, as specified in ASTM D1746 and ASTM D1003.

The present invention may be embodied in other forms without departing from the spirit and the essential attributes thereof, and, accordingly, reference should be made to the appended claims, rather than to the foregoing specification, as indicating the scope of the invention.

Refractive Index

The Refractive Index model for both propylene-based polymers and ethylene-based polymers was determined using *Polymer Handbook, 4th Ed*, Brandrup, Immergut, and Grulke, Eds., page VI/573 Table 1, as follows:

$$D(\text{Refractive Index}) = (D_{crystalline} - D_{amorphous}) * \text{Volume \% crystallinity} + D_{amorphous} = (D_{crystalline} - D_{amorphous}) * (\rho - \rho_{amorphous}) / (\rho_{crystalline} - \rho_{amorphous}) + D_{amorphous} \quad \text{(Equation B)}.$$

The densities of Equation B are listed in Table 8 below (note 1 g/cc–1 g/cm³).

TABLE 8

| Density | Propylene-based polymer | Ethylene-based polymer |
| --- | --- | --- |
| $D_{crystalline}$ (g/cc) | 1.5215 | 1.5626 |
| $D_{amorphous}$ (g/cc) | 1.4710 | 1.4795 |
| $\rho_{crystalline}$ (g/cc) | 0.936 | 1.000 |
| $\rho_{amorphous}$ (g/cc) | 0.850 | 0.855 |
| $\rho$ (Measure density of polymer in g/cc) | | |

The Refractive Index model for EVA copolymers was determined using *Polymer Handbook, European Polymer Journal* 48 (2012), pp. 974-980; FIG. 2, as follows:

$$D(\text{Refractive Index of } EVA) = 1.5149 - 0.001 * VA \quad \text{(Equation C)};$$

where VA is the vinyl acetate content (wt %) in the EVA copolymer.

We claim:

1. A polymeric blend composition comprising:
    (a) a first component selected from the group consisting of an ethylene/alpha-olefin copolymer and a propylene/ethylene copolymer;
    wherein said ethylene/alpha-olefin copolymer has density in the range of from 0.857 to 0.902 g/cm³, a melt index ($I_2$) in the range of from 0.2 to 30 g/10 minutes, a DCS melting point temperature (second heat) in the range of from 40 to 99° C., a heat of fusion in the range of from 18 to 108 Jg⁻¹, and a crystallinity in the range of from 6 to 37 weight percent, and wherein the ethylene/α-olefin copolymer, is a copolymer that comprises, in polymerized form, a majority amount of ethylene monomer, based on the weight of the copolymer, and an alpha-olefin, as the only two monomer types; and
    wherein propylene/ethylene copolymer has a melt flow rate in the range of from 1 to 30 g/10 minutes, a DCS melting point temperature (second heat) in the range of from 55 to 85° C., a heat of fusion in the range of from 10 to 40 Jg⁻¹, and a crystallinity in the range of from 6 to 21 weight percent;
    (b) from 10 to 40 percent by weight of a second component comprising an ethylene vinyl acetate copolymer comprising from 9 to 40 percent by weight of units derived from vinyl acetate, and wherein said ethylene vinyl acetate copolymer has a melt index ($I_2$) in the range of from 0.2 to 20 g/10 minutes;
    wherein $\Delta_n$ is less than 0.003, and wherein $\Delta_n$ is the absolute value of the difference between the refractive index of (a) and (b); and wherein dielectric loss factor of the polymeric blend composition is in the range of equal to, or greater than, 0.024.

2. An injection molded article comprising the polymeric blend composition of claim 1.

3. A film comprising the polymeric blend composition of claim 1.

4. A sheet comprising the polymeric blend composition of claim 1.

5. A tape comprising the polymeric blend composition of claim 1.

6. A multilayer structure comprising the film of claim 3 or the sheet of claim 4 or the tape of claim 5.

7. The polymeric blend composition of claim 1, wherein said polymeric blend composition has a haze of less than 36 percent.

8. The injection molded article of claim 2, wherein said polymeric blend composition has a haze of less than 36 percent.

9. The film of claim 3, wherein said polymeric blend composition has a haze of less than 36 percent.

10. The sheet of claim 4, wherein said polymeric blend composition has a haze of less than 36 percent.

11. The tape of claim 5, wherein said polymeric blend composition has a haze of less than 36 percent.

12. The multilayer structure of claim 6, wherein said polymeric blend composition has a haze of less than 36 percent.

13. An article comprising;
   a substrate, and
   a film associated with at least a surface of said substrate, wherein said film comprises the polymeric blend composition of claim 1, and wherein said film is coated or laminated to said at least one surface.

* * * * *